(12) United States Patent
Hynecek et al.

(10) Patent No.: US 12,176,937 B2
(45) Date of Patent: *Dec. 24, 2024

(54) MOBILE DEVICE MOUNTING APPARATUS

(71) Applicant: Speculative Product Design, LLC, San Mateo, CA (US)

(72) Inventors: Bryan Hynecek, Redwood City, CA (US); Jad Daye, Lawrenceville, GA (US)

(73) Assignee: Speculative Product Design, LLC, San Mateo, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/085,309

(22) Filed: Dec. 20, 2022

(65) Prior Publication Data

US 2024/0063838 A1 Feb. 22, 2024

Related U.S. Application Data

(63) Continuation-in-part of application No. 17/890,768, filed on Aug. 18, 2022, now Pat. No. 11,903,467.

(51) Int. Cl.
*F16M 11/00* (2006.01)
*H04B 1/3877* (2015.01)
*H04B 1/3888* (2015.01)
*H04M 1/04* (2006.01)

(52) U.S. Cl.
CPC ......... *H04B 1/3877* (2013.01); *H04B 1/3888* (2013.01); *H04M 1/04* (2013.01); *H04M 2201/08* (2013.01)

(58) Field of Classification Search
CPC ..... H04B 1/3877; H04B 1/3888; H04M 1/04; H04M 2201/08
See application file for complete search history.

(56) References Cited

U.S. PATENT DOCUMENTS

| | | | |
|---|---|---|---|
| 11,388,967 B1 * | 7/2022 | Riley | H04B 1/3888 |
| 2014/0287800 A1 * | 9/2014 | Ho | H04M 1/04 455/573 |
| 2016/0373152 A1 * | 12/2016 | Schmidt | A45C 11/00 |
| 2022/0029654 A1 * | 1/2022 | King | A45C 13/005 |
| 2023/0011854 A1 * | 1/2023 | Wang | H01F 7/0252 |
| 2023/0228290 A1 * | 7/2023 | Hughes | F16M 13/022 455/575.8 |
| 2024/0053840 A1 * | 2/2024 | Barnett | G01D 5/145 |

* cited by examiner

*Primary Examiner* — Amy J. Sterling
(74) *Attorney, Agent, or Firm* — HILL, KERTSCHER & WHARTON, LLP; Gregory T. Ourada (57) ABSTRACT

Disclosed herein is a mount featuring one or more sets of embedded magnets which are designed to engage with complimentary sets of magnets disposed either in a protective case for use with the mount, or in a mobile device contained within such a protective case. The mount includes a pin which is magnetically actuated to extend into a hole disposed in the protective case when the case and the mount are brought within a prescribed distance. Thus, the case and the mount "snap together" and are restrained from sliding relative to one another by the pin.

12 Claims, 12 Drawing Sheets

MOBILE DEVICE MOUNTING APPARATUS

BACKGROUND

Magnets have been used as attachment mechanisms for hundreds of years. More recently, mobile device manufacturers and accessory manufacturers have employed magnets as an unobtrusive means of fastening mobile devices securely to chargers, stands, docks, mounts, and other objects. Magnets are excellent for such purposes because the fastening force is generated invisibly through magnetic fields. One popular system of magnetic fastening systems is MagSafe™ which was developed by Apple, Inc., as described in U.S. Pat. No. 7,311,526. Smartphones employing MagSafe technology feature an internal array of magnets that facilitate the magnetic attachment of MagSafe compatible accessories such as chargers. While early MagSafe applications involved magnetic attachment of charging cables, the technology has expanded beyond this particular application, and is now used for attachment of a variety of accessories. The use of magnetic attachment technology facilitates not only technical, but also aesthetic design considerations. One issue with such magnetically-attached accessories is that they do not resist shearing forces very well, i.e. forces that tend to make the accessory slide parallel to the surface of the device to which it is attached. In fact, all of the resistance to an applied shear force (i.e. one acting perpendicularly to magnetic lines of force) is provided by frictional forces. The frictional force that resists shearing force is directly proportional to the magnetic force holding the device and the accessory together, as well as the coefficient of friction between the surfaces in contact. This magnetic force is limited by the requirement that the devices be separated without using undue force. Thus, the frictional force resisting shear force is limited by the necessity of limiting the magnetic force.

SUMMARY

It is desirable, therefore, to have a magnetic attachment mechanism that is resistant to shear force. The embodiments described herein involve a magnetically-influenced retractable protrusion located on a first device that is extended by magnetic force so that it locks into a corresponding cavity located on a second device. It is usually desirable for the retractable protrusion to be biased into the retracted position, so that it doesn't interfere with operation of the first device. In these embodiments, any mechanism which provides such mechanical bias such as a spring may be used. One preferred embodiment features a protective case for a mobile device such as a smartphone or tablet computer which incorporates a hole. An accessory, such as an inductive charger, mounting stand, or wallet, incorporates a retractable pin. The retractable pin is flush with the surface of the device that is designed to contact the protective case until the accessory is brought within a certain distance of the hole. At this point, magnetic forces which originate in either the magnetic fastening system incorporated into the device protected by the case or located in the case itself (preferably in the vicinity of the hole), cause the retractable pin to extend, so that the pin fits into the hole.

In this manner, the magnetic locking force is complemented by the resistance to shear force provided by the retractable pin.

The features of the above-described embodiments are not exclusive to each other, and any one of the features and embodiments can be combined with one or more of the other features and embodiments to arrive at further aspects of the invention.

DETAILED DESCRIPTION OF EMBODIMENTS

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise. The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well-known in the art, and because they do not facilitate a better understanding of the present invention, a discussion of such elements is not provided herein.

As used herein, "mobile device" refers to a mobile phone device, and electronic tablet device, a laptop computer, or other mobile computing system and the like. "Magnetic array" refers to a set of one or more magnets.

Figure 1:
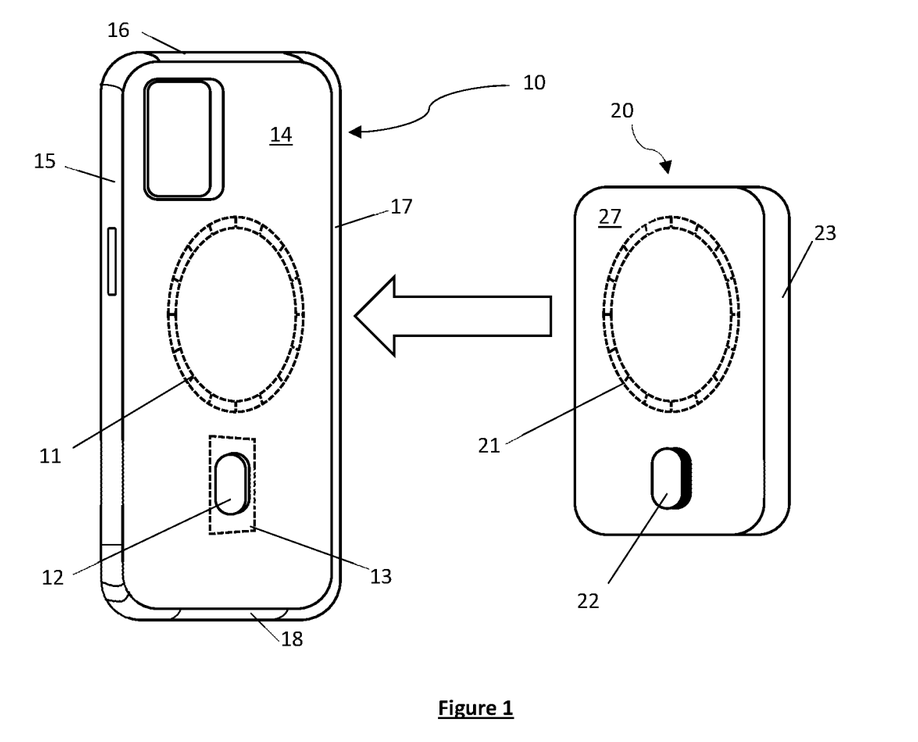
FIG. 1 is a perspective illustration of one embodiment of the claimed invention.
Figure 2:
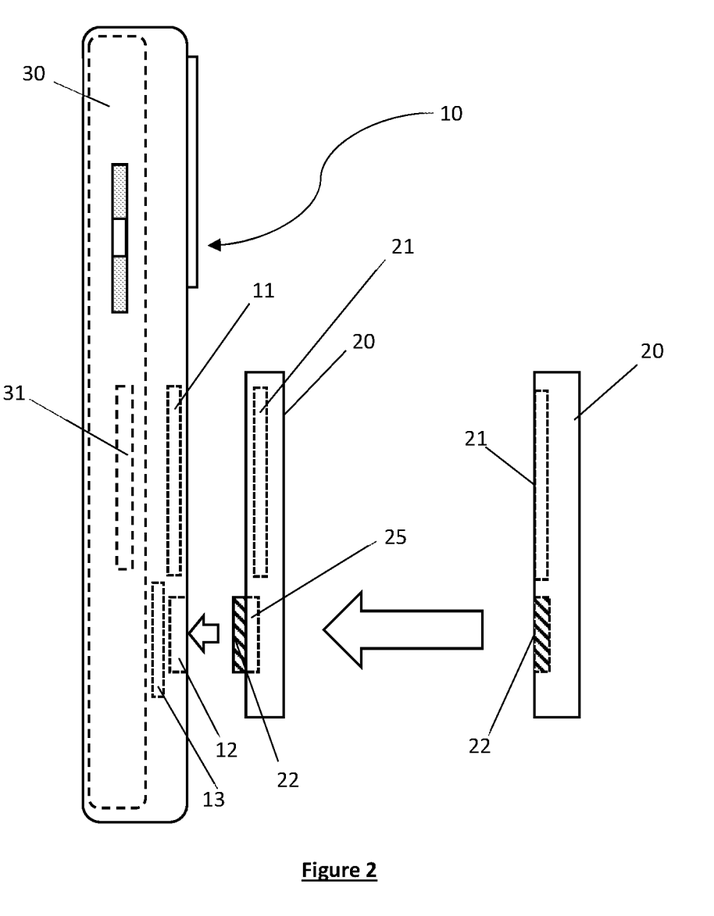
FIG. 2 is an elevation side view of the internal structure of the case and mount according to one embodiment of the claimed invention.
Figure 3:
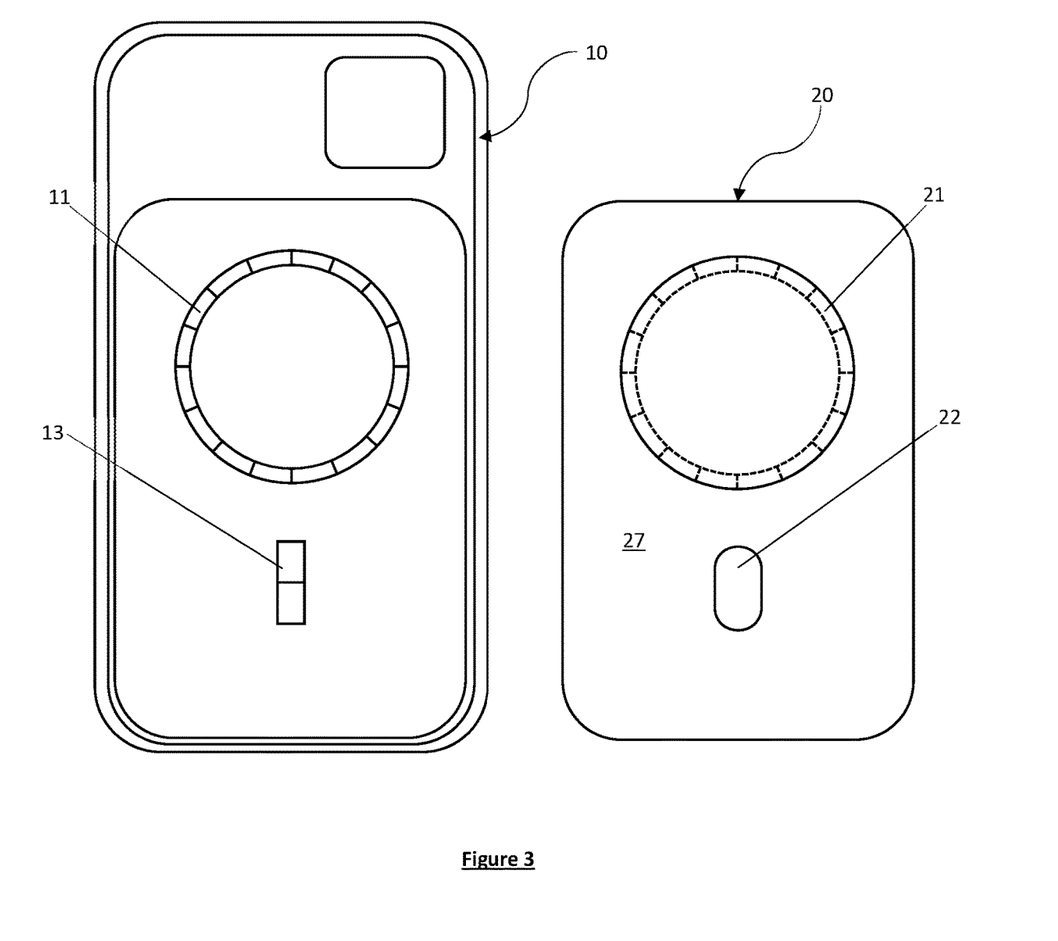
FIG. 3 is an elevation front view of the internal structure of the case and mount according to one embodiment of the claimed invention.

FIG. 1 illustrates one embodiment of an apparatus featuring a case 10 and mount 20 which are envisioned for use with mobile devices featuring magnetic attachment technology. Mobile device 30 in this embodiment shown in FIG. 2 employs a magnetic attachment means comprising a first magnetic array 31. Case 10 is constructed with a back wall 14, side walls 15 and 17, top wall 16, and bottom wall 18. The aforementioned structures define a cavity which is shaped to accommodate mobile device 30 as well as provide protection from impact and damage from contact (e.g. abrasion, scratches, etc.). FIG. 2 illustrates the mobile device 30 enclosed by the cavity of case 10. Back wall 14 incorporates a second magnetic array 11 having a defined polar orientation (e.g. N-S) such that a magnetic attractive force is generated between it and the first magnetic array 31 incorporated in mobile device 30.

Magnets always have two poles, north (N) and south (S), which define the magnetic orientation of the magnet, i.e. N-S or S-N. A mobile device incorporating magnetic attachment technology will have a first magnetic array 31 of one or more magnets disposed incorporated into the mobile device. This magnetic array will have a defined polar orientation, meaning that the poles of the magnets comprising the set will be oriented N-S or S-N. Magnetic lines of force run from N-S, with the consequence that opposite poles of magnets (i.e. N and S, or S and N) generate maximum attractive forces, while like poles of magnets (i.e. N and N, or S and S) generate maximum repulsive magnetic forces. Magnetic attachment technologies will use magnetic arrays which are oriented so that opposite magnetic poles are brought into proximity with one another, as illustrated by FIG. 3 of U.S. Pat. No. 7,311,526 (referenced in Background above), where magnetic elements 130, 170 are aligned so that the magnetic element on the plug is of opposite polarity with that on the socket.

Reference to "magnets" herein can refer to permanent magnets, temporary magnets, or electromagnets. Permanent magnets are comprised of a material (e.g. neodymium) which emit a magnetic field without requiring an external source of magnetism or electricity. Temporary magnets are made of iron or iron alloys (i.e. ferrous alloys). These materials exhibit magnet-like properties while in proximity to a magnetic field emitter such as a permanent magnet or electromagnet. Finally, electromagnets are comprised of materials exhibiting magnetic properties while conducting an electrical current. In the embodiments shown, either permanent or temporary magnets having a thickness of 0.5-1.0 mm will typically be used. The strength of the magnets' magnetic field B (typically expressed in gauss or tesla) is tailored to ensure that mount 20 will attach firmly to case 10 without being too difficult for the average user to separate.

Returning to FIG. 1, case 10 further features hole 12 in the exterior of back wall 14. Hole 12 can be in any desired shape (e.g. round, oval, polygonal). In the embodiment shown, there is a third magnetic array 13 disposed behind the hole, e.g. embedded in the back wall 14 of case 10. Mount 20 features a fourth magnetic array 21 disposed within (e.g. embedded) in mount body 23. Mount body 23 incorporates a pin 22 which is shaped to fit in hole 12.

Figure 4A:
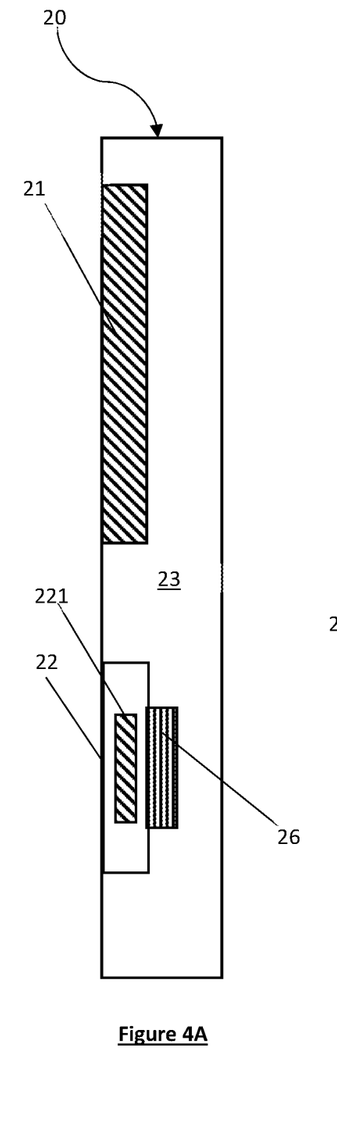
FIGS. 4A and 4B are elevation side views of the internal structure of the mount according to one embodiment of the claimed invention.
Figure 4B:
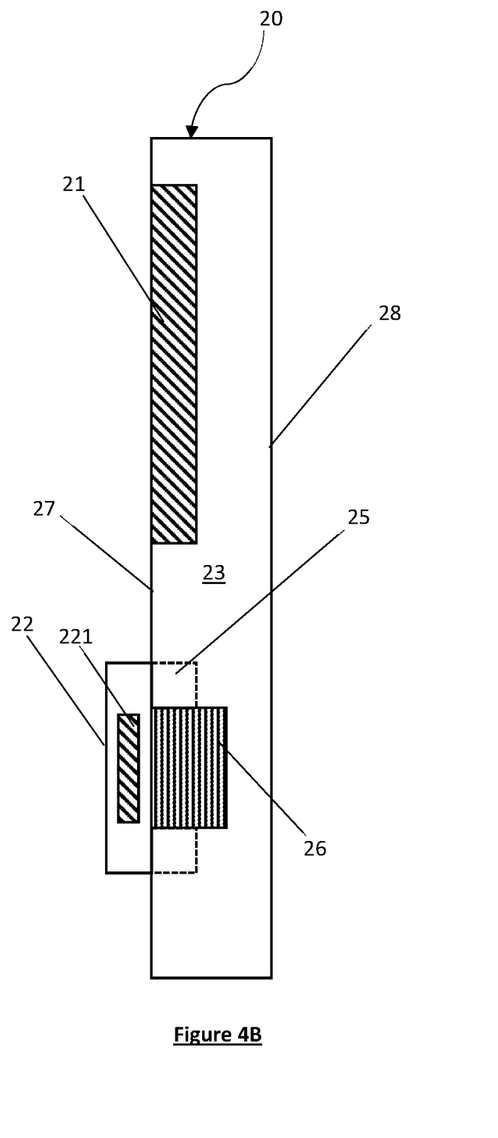

In other contemplated embodiment, pin 22 is disposed in a recess 25 as shown in FIGS. 2 and 4B. Pin 22 is attached to mount body 23 by a coiled spring or similar mechanism or material having springlike properties, i.e. where applied force varies with displacement. "Spring" can include, e.g. elastic materials (e.g. rubber), coiled springs, etc. 26 incorporated into or attached to the base of the recess 25 in which pin 22 is disposed. Pin 22 has an upper surface and a shaft and incorporates a fifth magnetic array 221. When pin 22 is located in recess 25, the upper surface of pin 22 is flush with the front side 27 of mount body 23 when pin 22 is in a retracted position. The fact that the upper surface of pin 22 is flush with the front side of mount by 23 when the pin is retracted gives the mount greater compatibility with cases for mobile devices featuring a magnetic array, but which do not have the hole featured in the embodiments herein. In certain contemplated embodiments, the pin is restricted to linear motion and is extended by magnetic force and retracted by gravity. In certain embodiments, pin 22 may protrude permanently from the front side 27 of mount body 23, although this limits the mount's ability to be used with cases which don't feature a hole. In yet another contemplated embodiment, hole 12 could be located in mount 20, and pin 22, and recess 25 may be disposed in the back wall 14 of case 10.

FIG. 2 illustrates the internal structure of case 10 and mount 20. FIG. 2 illustrates that as mount 20 is brought into proximity to case 10 magnetic force is generated both between a second magnetic array 11 and a fourth magnetic array 21 which will "snap" case 10 and mount 20 together. Simultaneously, as pin 22 comes into proximity with hole 12, magnetic forces generated through interaction between the third magnetic array 13 and pin 22 will cause it to extend toward the hole 12 against the restraining force of spring 26. This is illustrated in FIGS. 4A and 4B. Generally, the word "proximity" pertaining to magnets herein refers to a distance where a generated magnetic force causes an acceleration in a referenced component relative to an available degree of freedom.

An alternate embodiment omits spring 26 in lieu of a sixth magnetic array 29 disposed at the bottom of recess 25. The strength of the magnet(s) comprising sixth magnetic array 29 is precisely selected so that pin 22 is restrained until a precise distance between case 10 and mount 20 is reached, at which point the magnetic force generated between the third magnetic array 13 and fifth magnetic array 221 incorporated into pin 22 overcomes that between the fifth and sixth magnetic arrays, and the pin 22 would quickly translate outward to engage hole 12. Alternate embodiments featuring a combination of spring 26 and magnets array 29 in the recess 25 are also contemplated.

Figure 5A:
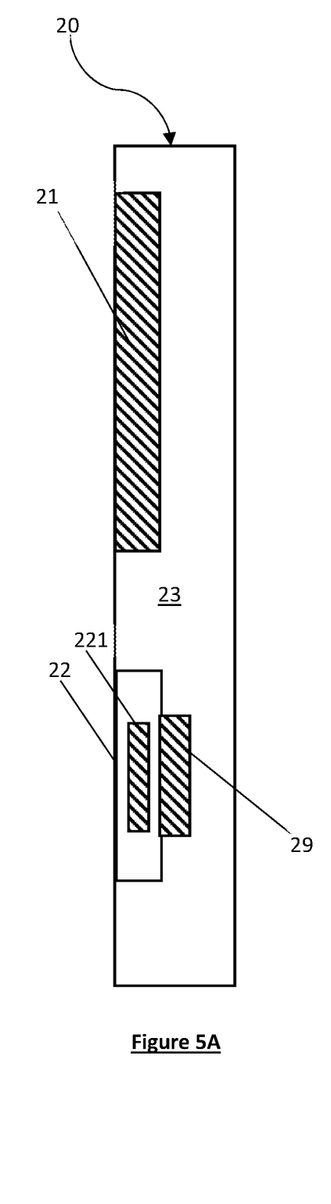
FIGS. 5A and 5B are elevation side views of the internal structure of the mount according to an alternate embodiment of the claimed invention.
Figure 5B:
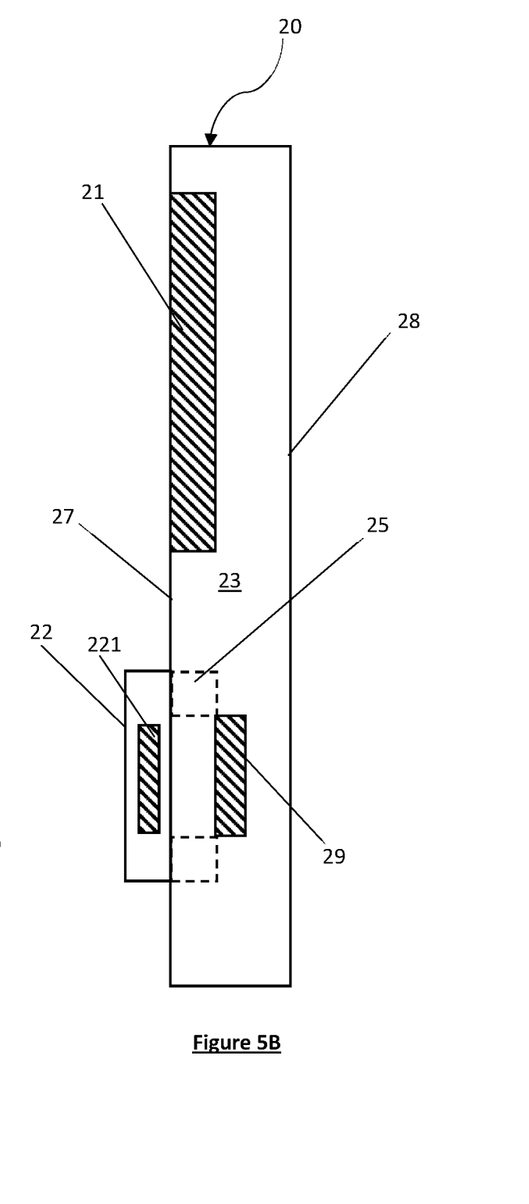

In another embodiment, case 10 omits the second magnetic array 11 and fourth magnetic array 13, relying instead on the first magnetic array 31 residing in the mobile device. Mount 20 in this embodiment would still feature magnetic arrays 21 and 221. See FIGS. 5A and 5B. Yet another embodiment may omit mount magnetic array 21, and simply rely on pin 22. In this embodiment, the pin and recess may be disposed opposite the first set of magnets 31, and hole 12 may be disposed in case 10 directly opposite the first set of magnets 31.

The embodiments illustrated herein may be employed for a wide variety of applications. One application would feature mount 20 as part of an apparatus used to mount a mobile device 30 in a vehicle. Another application would incorporate mount 20 into a wallet that snaps onto case 10. Mount 20 could also be incorporated into a tripod for a camera incorporated into mobile device 30. Mount 20 may be part of a flashlight that snaps onto the back of case 10. Mount 20 may also form part of a removable portable battery or a handle, camera monopod, etc. With the above in mind, while the structure of the front side 27 of mount 20 is as described herein, the back side 28 of mount 20 will vary widely depending upon the particular application of which the mount is a part.

Figure 6:
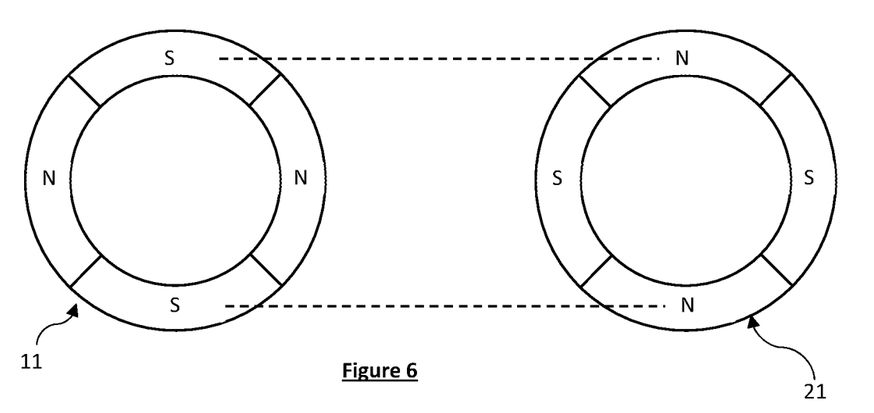
FIG. 6 illustrates a configuration for a self-aligning magnetic array that may be incorporated into one or more embodiments.
Figure 7:
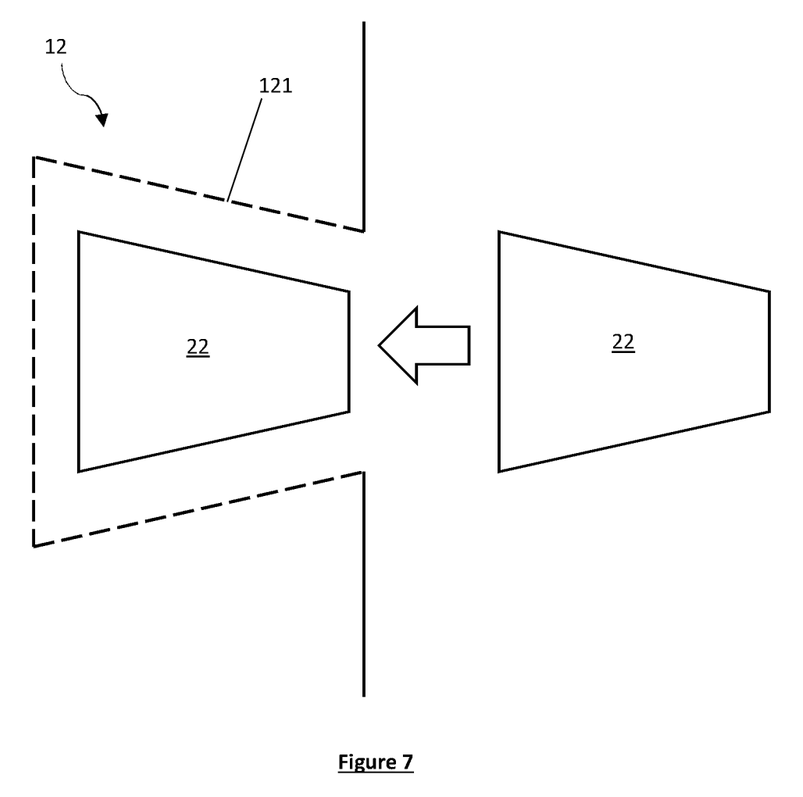
FIG. 7 is an illustration of an internally-biased hole and pin configuration according to one embodiment.

Magnetic arrays 11 and 21 of case 10 and mount 20 respectively may be constructed in such a way that these magnetic arrays are self-aligning. This is desirable in order to ensure that pin 22 is properly aligned with hole 12, taking advantage of the fact that north poles (N) and south poles (S) attract. One such arrangement is illustrated in FIG. 6 where an improper alignment will tend to cause a repulsive force generated by like poles. For the configuration shown in FIG. 6, with four magnets, a misalignment of up to 45 degrees can be corrected. Using six magnets, the alignment can be off by approximately 30 degrees, and so on according to the formula M=360/2n where M is the maximum angular misalignment and n is an even positive number of magnets disposed in the circular configuration illustrated in FIG. 6. FIG. 7 illustrates an embodiment of hole 12 that facilitates engagement of the pin 22 into hole 12.

Figure 8:
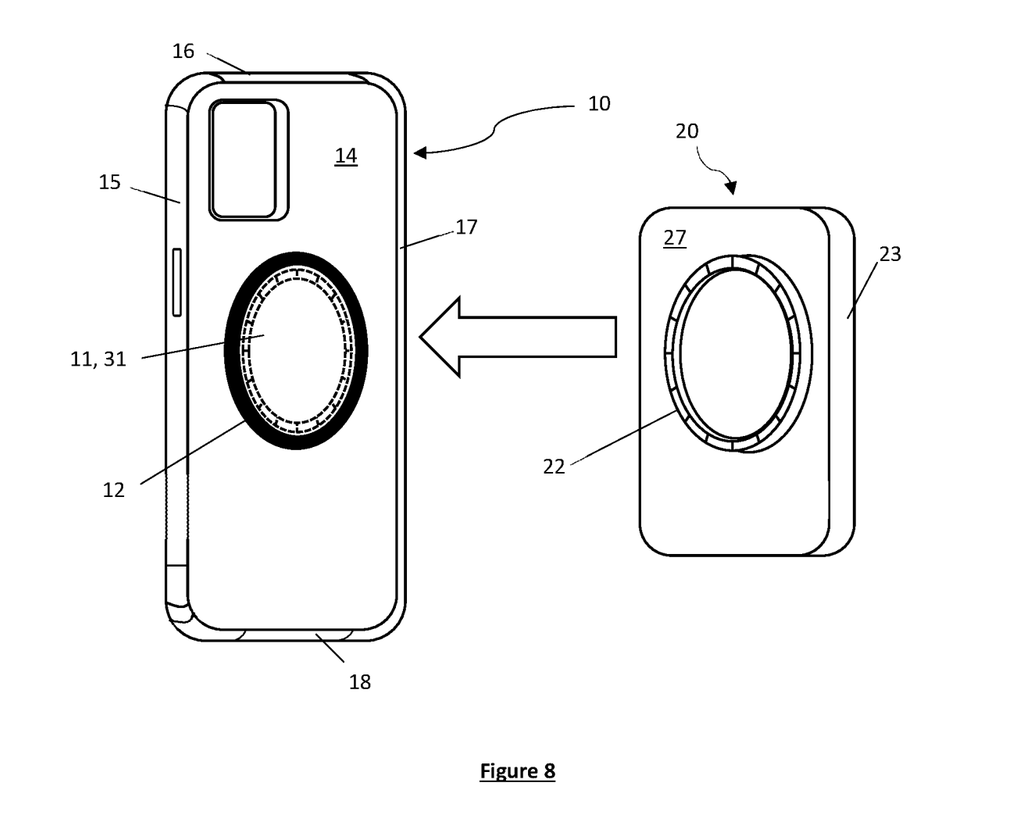
FIG. 8 illustrates an alternate configuration of the case and mount according to one embodiment.

Although the foregoing embodiments have featured a hole 12 having walls that typically descend perpendicularly from the opening of the hole, certain embodiments of hole 12 feature inwardly-biased walls 121 (the angles shown in FIG. 7 are exaggerated somewhat for clarity). In such embodiments, the upper surface and/or shaft of pin 22 is outwardly-flared (e.g. shaped trapezoidally) to engage the inwardly-biased walls as illustrated in FIG. 7. Such a configuration enhances the engagement between pin 22 and hole 12, further resisting any shearing forces by further reducing the tendency of pin 22 to slide out of hole 12. An alternative embodiment of that illustrated in FIG. 1 is shown in FIG. 8. In this embodiment, the functions of the magnetic attachment arrays 11 or 31 located in the case or the mobile device, respectively, and magnetic array 21 in the mount are combined with that of the pin 22 and hole 12. That is, the magnetic attachment arrays and the pin and hole are combined into a single structure. This embodiment features a hole 12, located above the magnetic arrays 11 or 31. Pin 22 is disposed so that when mount 20 is opposite hole 12, pin 22 (which in the embodiment shown is ring-shaped) will extend from recess 25 into hole 12. In the embodiment shown, the magnetic arrays 11, 21, and 31 are circular, so hole 12 will be ring shaped, with magnetic arrays 11 and 31 disposed in proximity to hole 12 so that the magnetic field is strong enough to cause pin 22 to extend into hole 12. In other variations of this particular embodiment, hole 12 and pin 22 may be shaped similarly to those shown in FIGS. 1-5.

Figure 9:
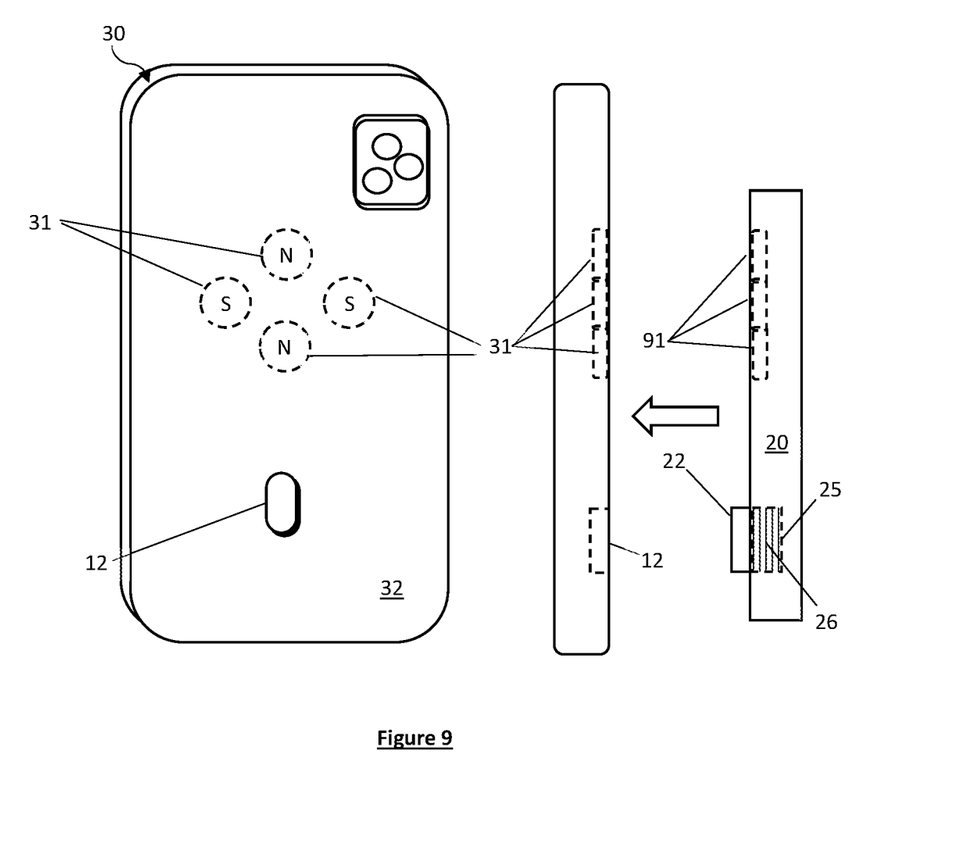
FIG. 9 illustrates a first exemplary mounting system embodiment featuring a hole adapted to accommodate a pin incorporated directly into the body of a mobile device in the form of a smartphone, and a mount having a spring-loaded pin.
Figure 10:
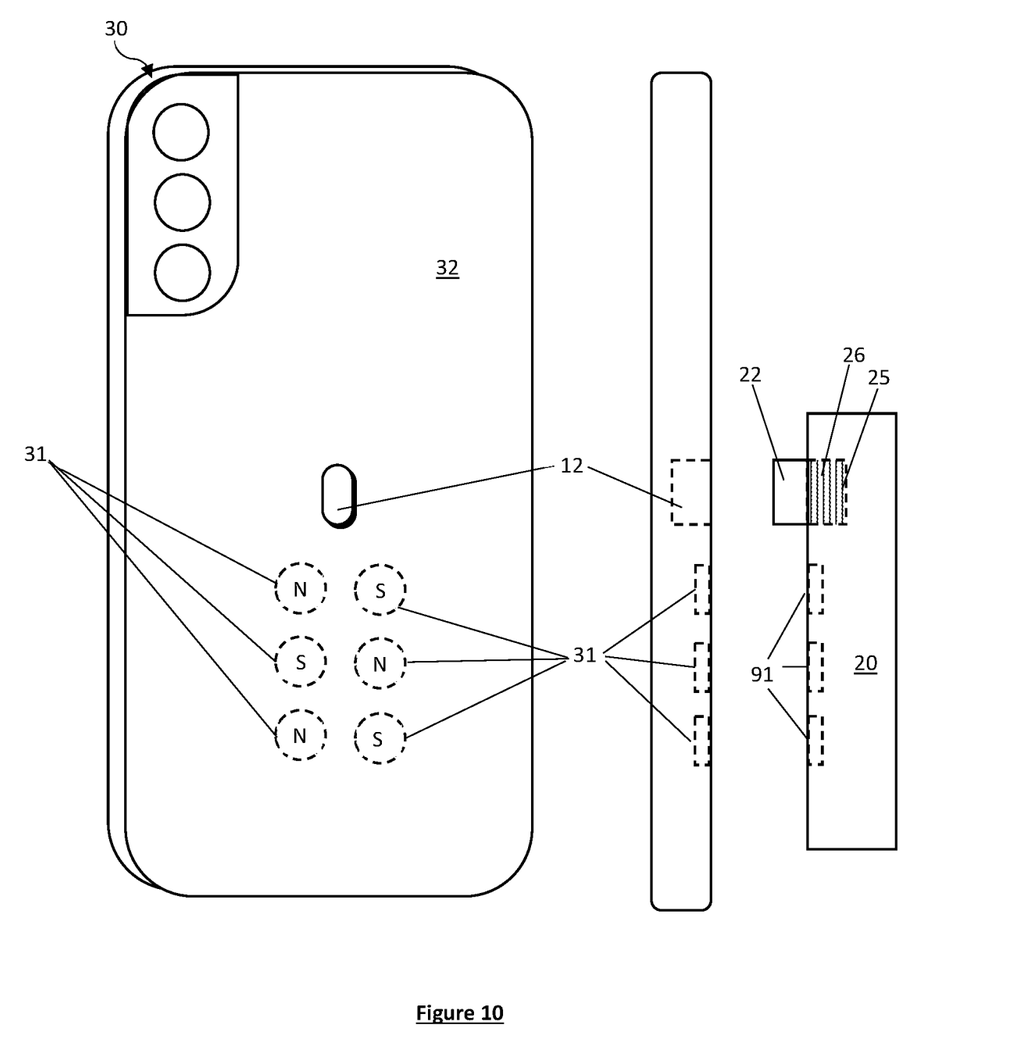
FIG. 10 illustrates a second exemplary mounting system embodiment featuring a hole adapted to accommodate a pin incorporated directly into the body of a mobile device in the form of a smartphone, and a mount having a spring-loaded pin.
Figure 11:
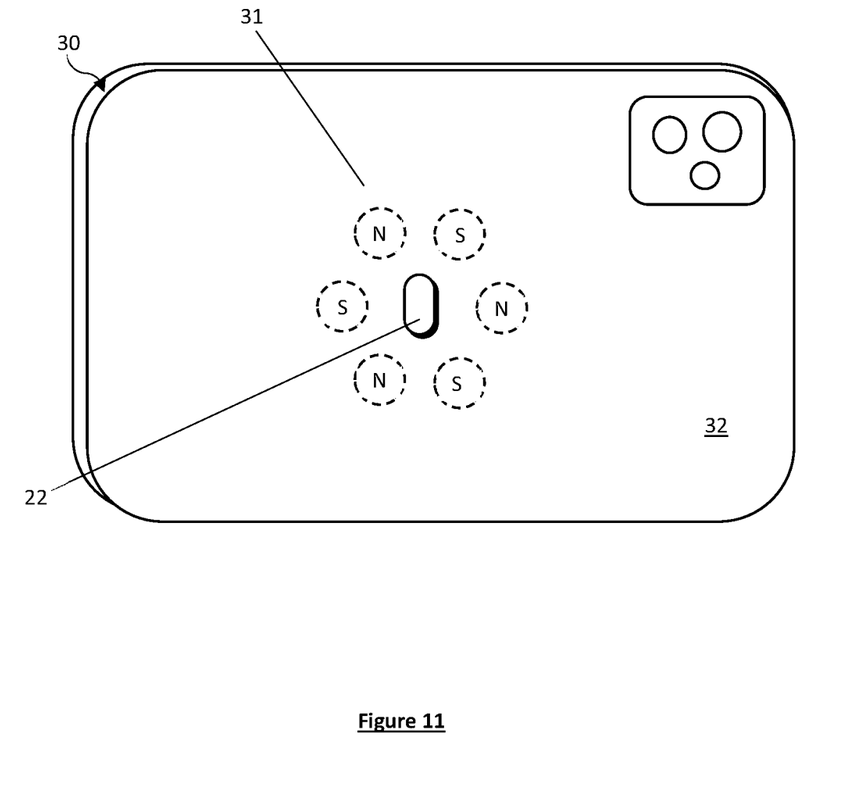
FIG. 11 illustrates a mounting system embodiment featuring a hole incorporated into the body of a mobile device in the form of a tablet computer.

The principles described herein for more securely mounting mobile devices may also be applied to embodiments of a mounting system which omit case 10. Such embodiments are illustrated in FIGS. 9-11. As disclosed above, mobile device 30 comprises a first magnetic array 31, which is intended to facilitate attachment to mount 20. First magnetic array is generally located in proximity to the rear face 32 of mobile device 30. In the embodiments illustrated in FIGS. 9-11, hole 12 is disposed directly in the rear face 32 of mobile device 30. Mobile devices 30 shown in FIGS. 9 and 10 are exemplary embodiments of a mobile device in the form of a smart phone, while that shown in FIG. 11 is a mobile device in the form of a tablet computer. This embodiment also illustrates that the hole can be located in within the area of magnetic array 31. This embodiment may eliminate the need to have a separate magnetic array 13 at the base of hole 12.

FIGS. 9 and 10 also illustrate an alternative embodiment of mount 20 in which pin 22 is extended by default, in contrast to embodiments where pin 22 is recessed by default. In the embodiments shown in FIGS. 9 and 10, spring 26 is located in recess 25 and attaches to the rear of pin 22. The spring in this embodiment is biased toward compression as opposed to tension, with the result that pin 22 is extended to be inserted into hole 12 by default. However, if mount 20 is used with mobile device 30 which does not incorporate hole 12, the force of the rear face 32 of such mobile device forces pin 22 against spring 26 into recess 25. When the mobile device 30 is removed from the mount, pin 22 is extended by the force of spring 26 back into its default extended position, as illustrated in FIGS. 9-10. In other embodiments, it may be desirable for the pin 22 to extend and retract manually, without having to rely on magnets to draw pin 22 out of recess 25. In such embodiments, spring 26 could be replaced by a latching spring mechanism similar to that used in latching pushbuttons, where manual pressure on the top of pin 22 in the retracted position would release a latch holding pin 22 in the recess (i.e. such that the top of pin 22 is flush with the surface surrounding the recess opening). Similarly, manual pressure on the top of pin 22 in the extended position will cause pin 22 to retract into recess 25, at which point the latch will engage to hold pin 22 in the retracted position.

In the embodiments shown in FIGS. 9-11, it is desirable to have first magnetic array 31 arranged in a configuration that will automatically align hole 12 with pin 22 when the corresponding mount magnetic array 91 is brought into proximity to the first magnetic array 31. As referenced above, this can be accomplished by alternating the magnetic poles of the individual magnets comprising these arrays, as well as by the geometric arrangement of the arrays themselves. FIGS. 9-10 each illustrate an example of such configurations. It will be appreciated that having the spring loaded pin 22 shown in FIGS. 9 and 10 facilitates the attachment of mount 20 to mobile device 30. In the event of a slight misalignment between pin 22 and hole 12 when mount 20 and mobile device 30 when the two are first brought into proximity, the force of the magnets may cause the pin 22 to contact the rear face 32 initially. In this case, pin 22 will retract into recess 25 until opposite poles of the individual magnets comprising the magnetic arrays are fully aligned, at which point the outward force of spring 26 will cause pin 22 to extend into hole 12.

Other variations on embodiments shown in FIGS. 9-11 may feature the first magnetic array 31 disposed around hole 12, such that the magnetic force from the first magnetic array 31 will draw pin 22 from recess 25. In these embodiments, one end of pin 22 is attached to an extension spring 26 which is tailored to provide enough force to retract the pin 22 into recess 25 when the first magnetic array 31 is not in proximity to pin 22. As in previous embodiments, the top of pin 22 is shaped so that it is flush with the surface of mount 20 when disposed in a retracted position in recess 25, and the top of pin 22 also comprises either a permanent or a temporary magnet.

Figure 12:
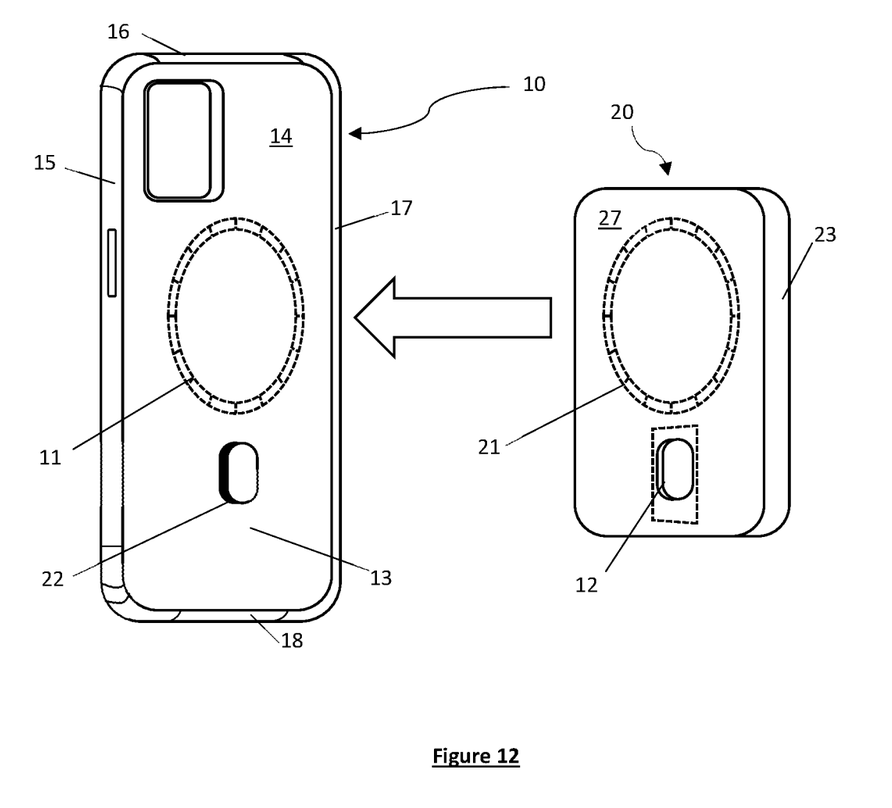
FIG. 12 illustrates an embodiment where the pin extends from the case, and the hole is located in the body of the mount.
Figure 13:
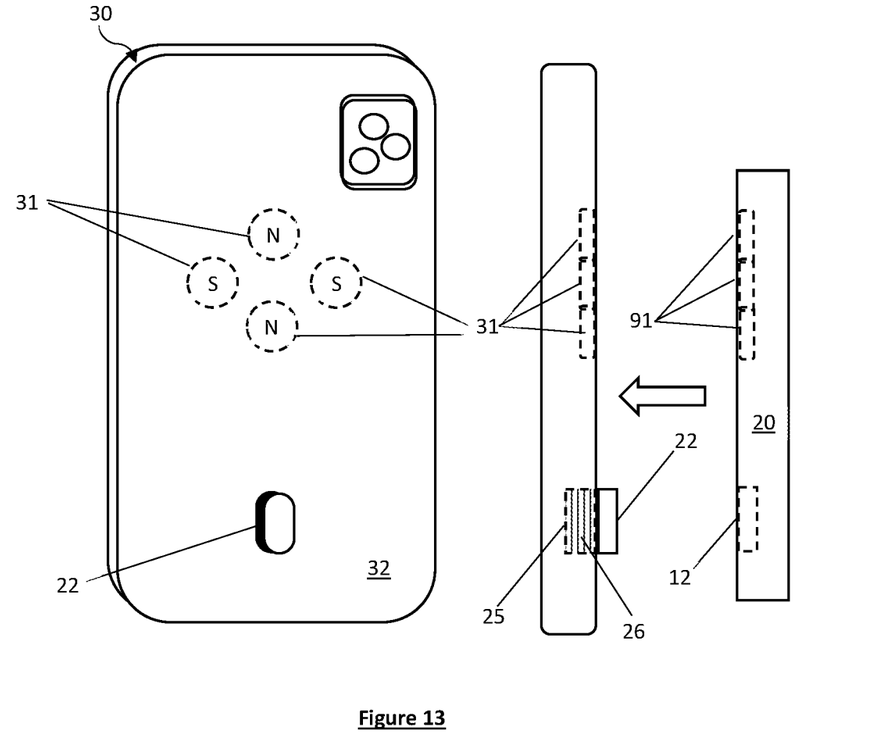
FIG. 13 illustrates an embodiment where the in extends from a rear face of the mobile device, and the hole is located in the body of the mount.

FIG. 12 illustrates yet another set of embodiments in which pin 22 may extend from the case 10 into a hole 12 located in mount 20. FIG. 13 illustrates a related set of embodiments in which pin 22 extends from a recess 25 disposed in the rear face 32 of mobile device 30.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. It is noted that the terminology used above is for the purpose of reference only, and is not intended to be limiting. For example, terms such as "first", "second", and "third" may be used to describe embodiments incorporating multiple sets of similarly-constituted elements to distinguish between such sets for clarity with reference to such embodiment(s) only. Furthermore, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

What is claimed is:

1. A mobile device adapted for use with a mount, the mount comprising an array of attachment magnets and a pin, the mobile device comprising:
 a first magnetic array disposed in proximity to a rear face of the mobile device; and
 a hole comprising an opening in the rear face of the mobile device, wherein the hole is adapted to accommodate the pin, and wherein the hole is disposed within the first magnetic array.

2. The mobile device according to claim 1, wherein adjacent magnets comprising the first magnetic array have opposite magnetic polarity.

3. The mobile device according to claim 2, wherein each magnet comprising the first magnetic array corresponds to a magnet comprising the array of attachment magnets and has opposite magnetic polarity thereto.

4. A mounting apparatus for a mobile device comprising:
 a first magnetic array disposed within the mobile device;
 a hole comprising an opening in a rear face of the mobile device, wherein the hole is adapted to accommodate a pin; and
 a mount comprising:
  a surface adapted to contact the rear face of the mobile device;
  the pin;
  a compression spring attached to a first end of the pin; and
  a recess having sufficient depth to accommodate the compression spring and the pin when the pin is in a retracted position.

5. The mounting apparatus according to claim 4, wherein the pin is in the retracted position when a second end of the pin is even with the surface.

6. A mounting apparatus for a mobile device comprising:
 a first magnetic array disposed within the mobile device;
 a hole comprising an opening in a rear face of the mobile device, wherein the hole is adapted to accommodate a pin; and
 a mount comprising:
  a surface adapted to contact the rear face of the mobile device; the pin;
  an extension spring attached to a first end of the pin; and
  a recess having sufficient depth to accommodate the extension spring and the pin when the pin is in a retracted position.

7. The mounting apparatus according to claim 6, wherein the pin is in the retracted position when a second end of the pin is even with the surface.

8. A mobile device adapted for use with a mount, the mount comprising an array of attachment magnets and a hole, the mobile device comprising:
 a pin disposed in a recess in a rear face of the mobile device, wherein the pin is adapted to extend outward from the rear face of the mobile device and fit into the hole, wherein the pin contains a magnet such that the pin extends from the recess when the array of attachment magnets is brought into in proximity with the pin.

9. A protective case for a mobile device, the protective case adapted for use with a mount comprising a first magnetic array and a hole, wherein the protective case comprises:
 a recess disposed in a back wall of the protective case;
 a pin disposed in the recess and adapted to transition from a fully retracted position to a fully extended position relative to the recess where a portion of the pin extends into the hole in the fully extended position; and
 a second magnetic array;
 wherein the first magnetic array and the second magnetic array generate an attractive force when in proximity to one another.

10. The protective case according to claim 9, wherein the pin comprises a third magnetic array, wherein the pin transitions from the fully retracted position to the fully extended position relative to the recess when the third magnetic array is in proximity to the first magnetic array.

11. The protective case according to claim 9, wherein the recess comprises a latching spring coupled to the pin.

12. The protective case according to claim 9, wherein the recess comprises a compression spring coupled to the pin, wherein the compression spring biases the pin into a fully extended position in the absence of an applied force on the pin.

\* \* \* \* \*